US007681004B2

(12) United States Patent
Bonella et al.

(10) Patent No.: US 7,681,004 B2
(45) Date of Patent: Mar. 16, 2010

(54) ADVANCED DYNAMIC DISK MEMORY MODULE

(75) Inventors: Randy M. Bonella, Portland, OR (US); Chung W. Lam, Hillsborough, CA (US)

(73) Assignee: ADDMM, LLC, Ronkonkoma, NY (US)

( * ) Notice: Subject to any disclaimer, the term of this patent is extended or adjusted under 35 U.S.C. 154(b) by 95 days.

(21) Appl. No.: 11/453,293

(22) Filed: Jun. 13, 2006

(65) Prior Publication Data

US 2007/0079065 A1 Apr. 5, 2007

Related U.S. Application Data

(60) Provisional application No. 60/690,451, filed on Jun. 13, 2005.

(51) Int. Cl.
*G06F 12/00* (2006.01)
*G06F 13/00* (2006.01)
*G06F 13/28* (2006.01)

(52) U.S. Cl. .................. 711/169; 711/104; 711/113; 711/202; 711/150; 711/103

(58) Field of Classification Search .................. 711/104, 711/113, 202, 150, 103, 169
See application file for complete search history.

(56) References Cited

U.S. PATENT DOCUMENTS

| 3,568,153 | A | * | 3/1971 | Kurtz et al. | 714/764 |
| 4,937,791 | A | * | 6/1990 | Steele et al. | 365/230.03 |
| 5,313,585 | A | * | 5/1994 | Jeffries et al. | 711/201 |
| 5,519,831 | A | * | 5/1996 | Holzhammer | 714/22 |
| 5,634,137 | A | * | 5/1997 | Merkin et al. | 710/10 |
| 5,787,489 | A | * | 7/1998 | Pawlowski | 711/169 |
| 5,937,423 | A | * | 8/1999 | Robinson | 711/103 |
| 6,044,012 | A | * | 3/2000 | Rao et al. | 365/182 |
| 6,370,614 | B1 | * | 4/2002 | Teoman et al. | 711/113 |
| 6,581,130 | B1 | * | 6/2003 | Brinkmann et al. | 710/306 |
| 6,785,767 | B2 | * | 8/2004 | Coulson | 711/112 |
| 2003/0084252 | A1 | * | 5/2003 | Talagala | 711/135 |
| 2006/0248387 | A1 | * | 11/2006 | Nicholson et al. | 714/22 |

* cited by examiner

*Primary Examiner*—Stephen Elmore
*Assistant Examiner*—Mark A Giardino, Jr.
(74) *Attorney, Agent, or Firm*—Raymond J. Werner

(57) ABSTRACT

Memory modules address the growing gap between main memory performance and disk drive performance in computational apparatus such as personal computers. Memory modules disclosed herein fill the need for substantially higher storage capacity in end-user add-in memory modules. Such memory modules accelerate the availability of applications, and data for those applications. An exemplary application of such memory modules is as a high capacity consumer memory product that can be used in Hi-Definition video recorders. In various embodiments, memory modules include a volatile memory, a non-volatile memory, and a command interpreter that includes interfaces to the memories and to various busses. The first memory acts as an accelerating buffer for the second memory, and the second memory provides non-volatile backup for the first memory. In some embodiments data transfer from the first memory to the second memory may be interrupted to provide read access to the second memory.

20 Claims, 14 Drawing Sheets

Multi Channel FLASH Operational Flow Diagram

FIG. 1  Memory Hierarchy

FIG. 2  PC System Block Diagram    (Prior Art)

FIG. 3 PC System with ADDMM Conguration Options

FIG. 4 Module Functional Block Diagram

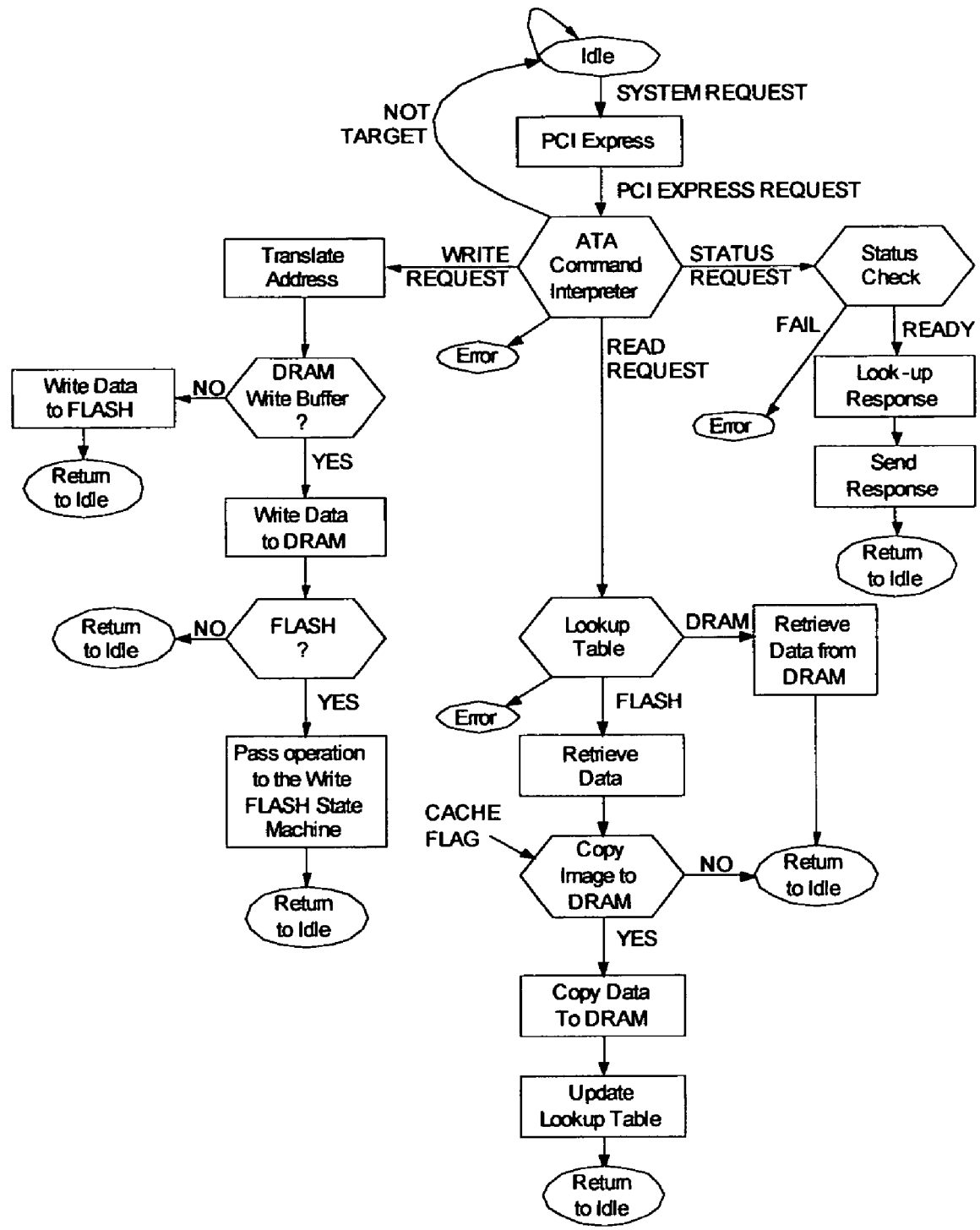
FIG. 6 Functional Flow Diagram

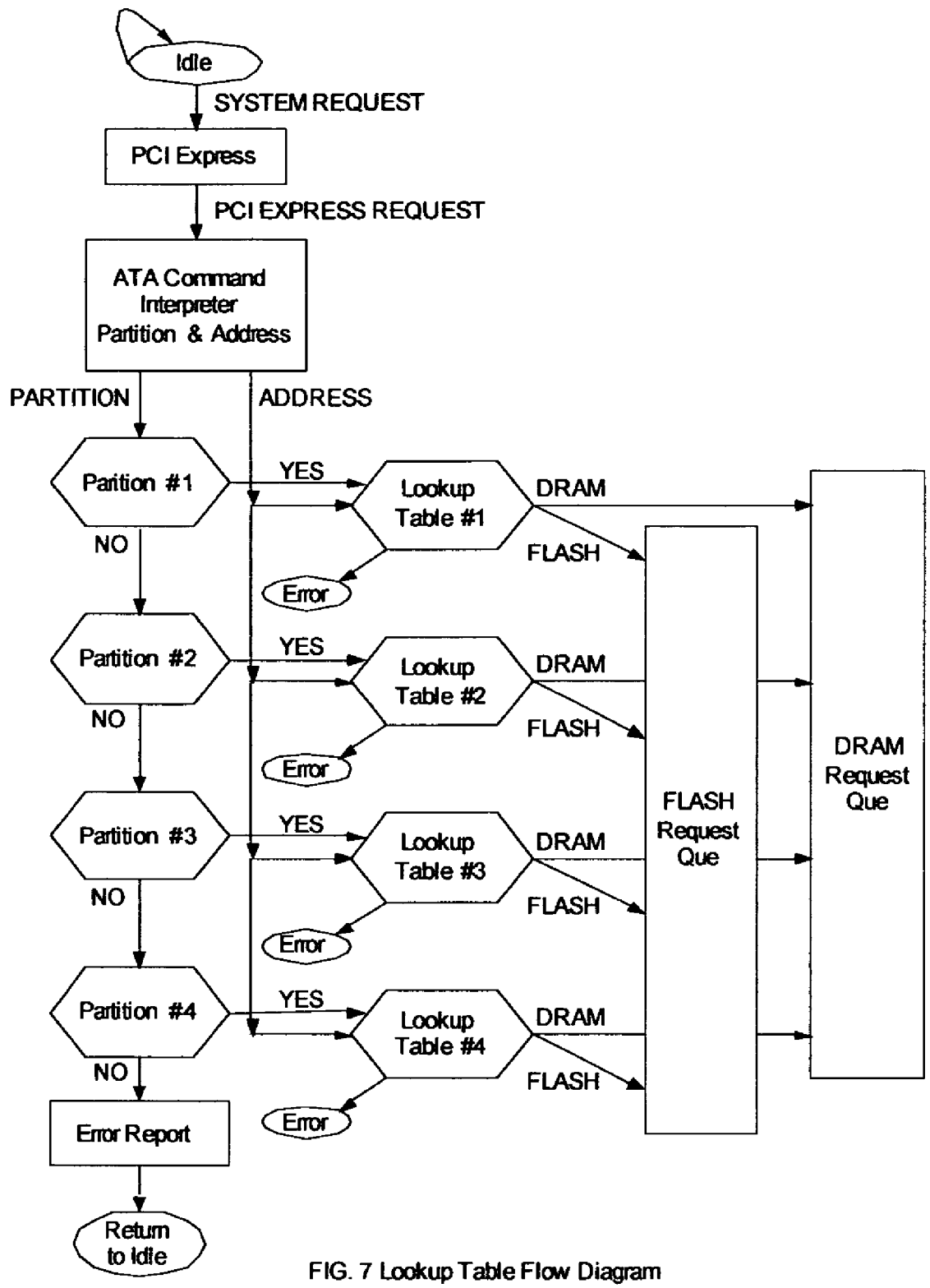
FIG. 7 Lookup Table Flow Diagram

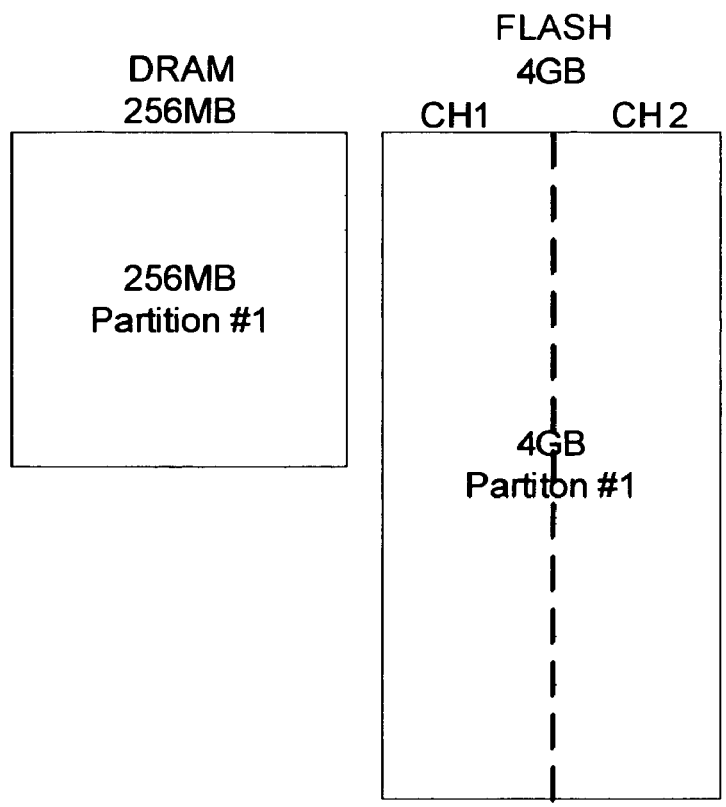
FIG. 8 One Partition Memory Map
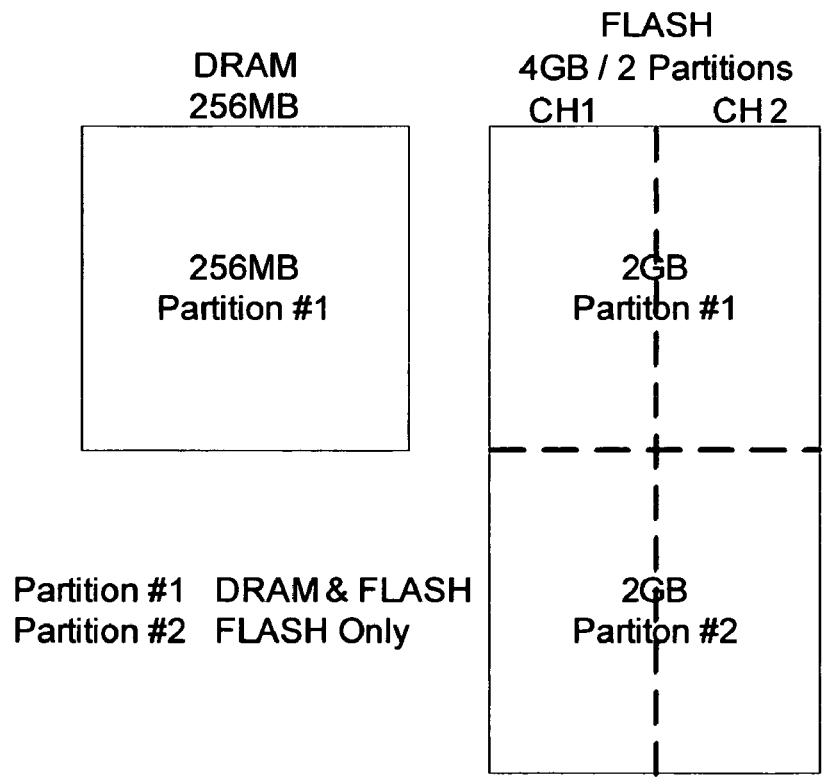
FIG. 9 Two Partition Memory Map

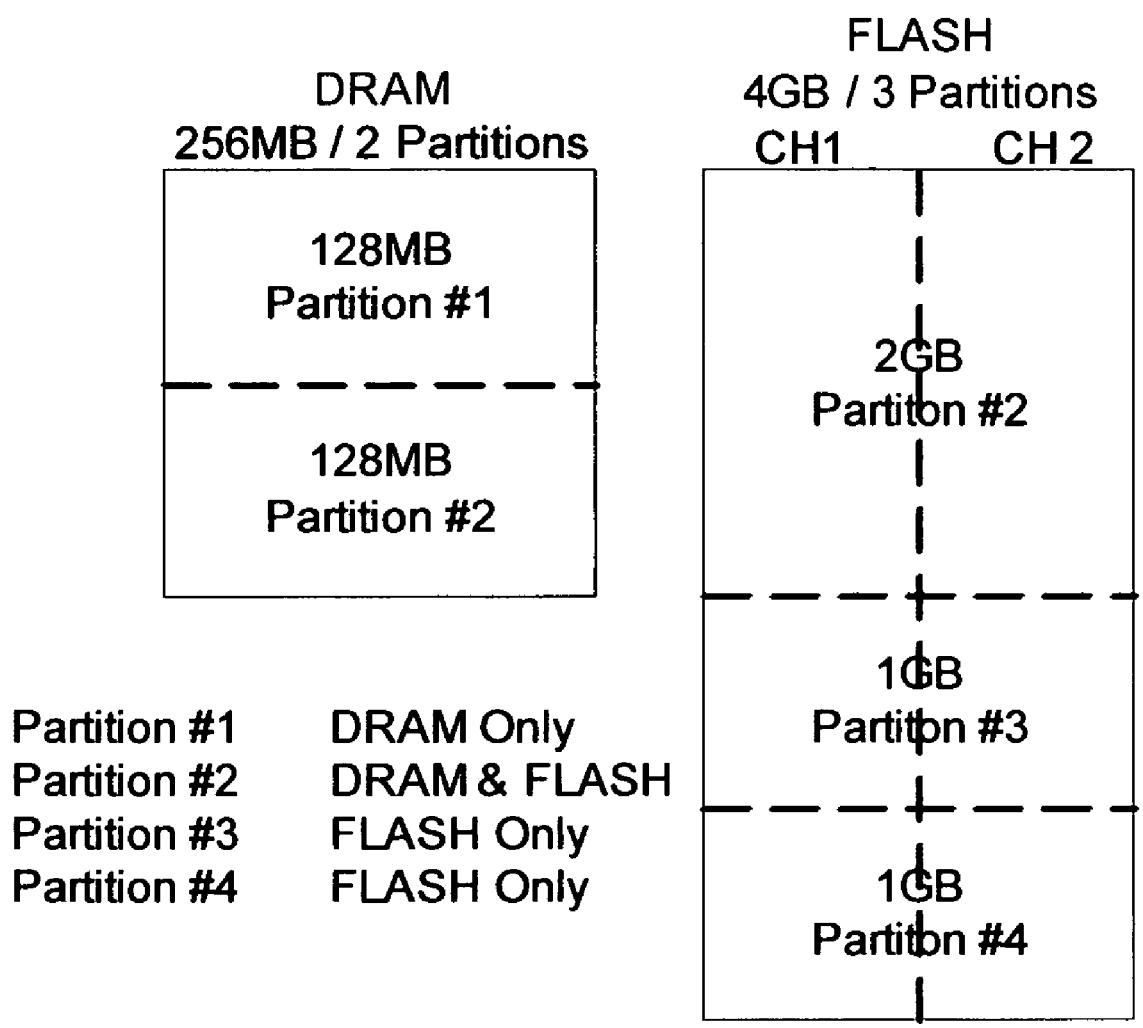
FIG. 10 Four Partition Memory Map

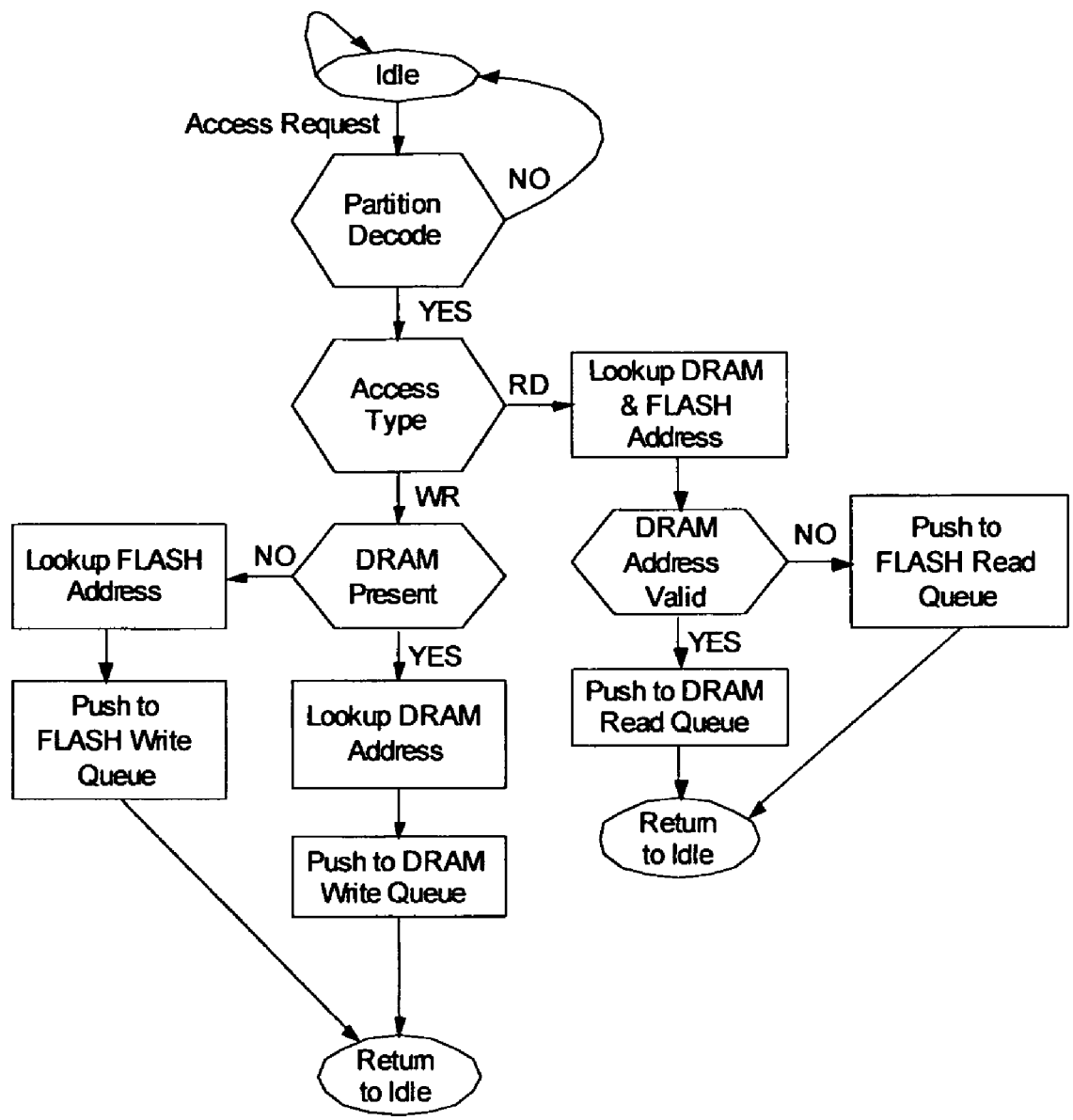
FIG. 11 Address Table Flow Diagram

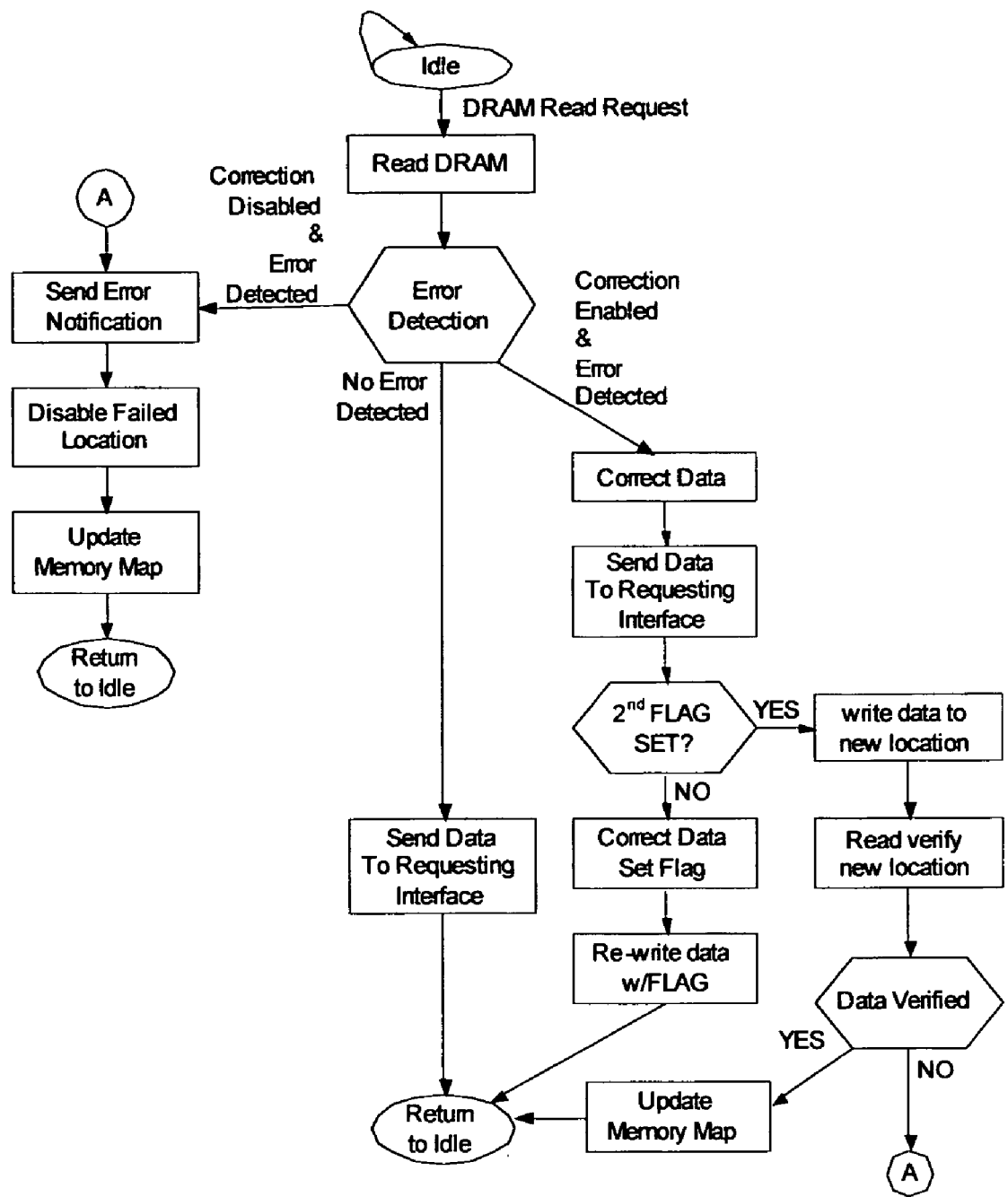
FIG. 12 DRAM ECC Flow Diagram

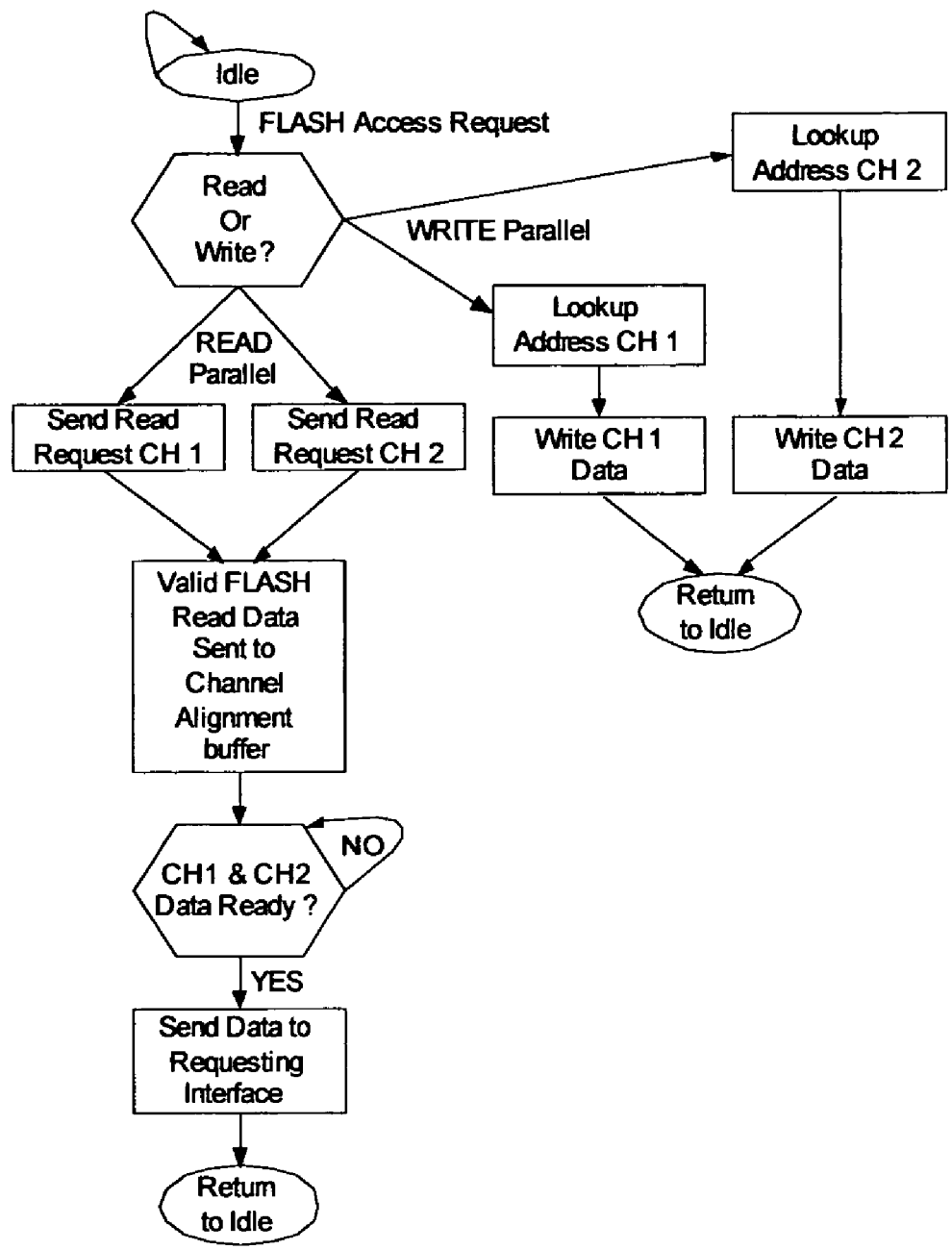
FIG. 13 Multi Channel FLASH Operational Flow Diagram

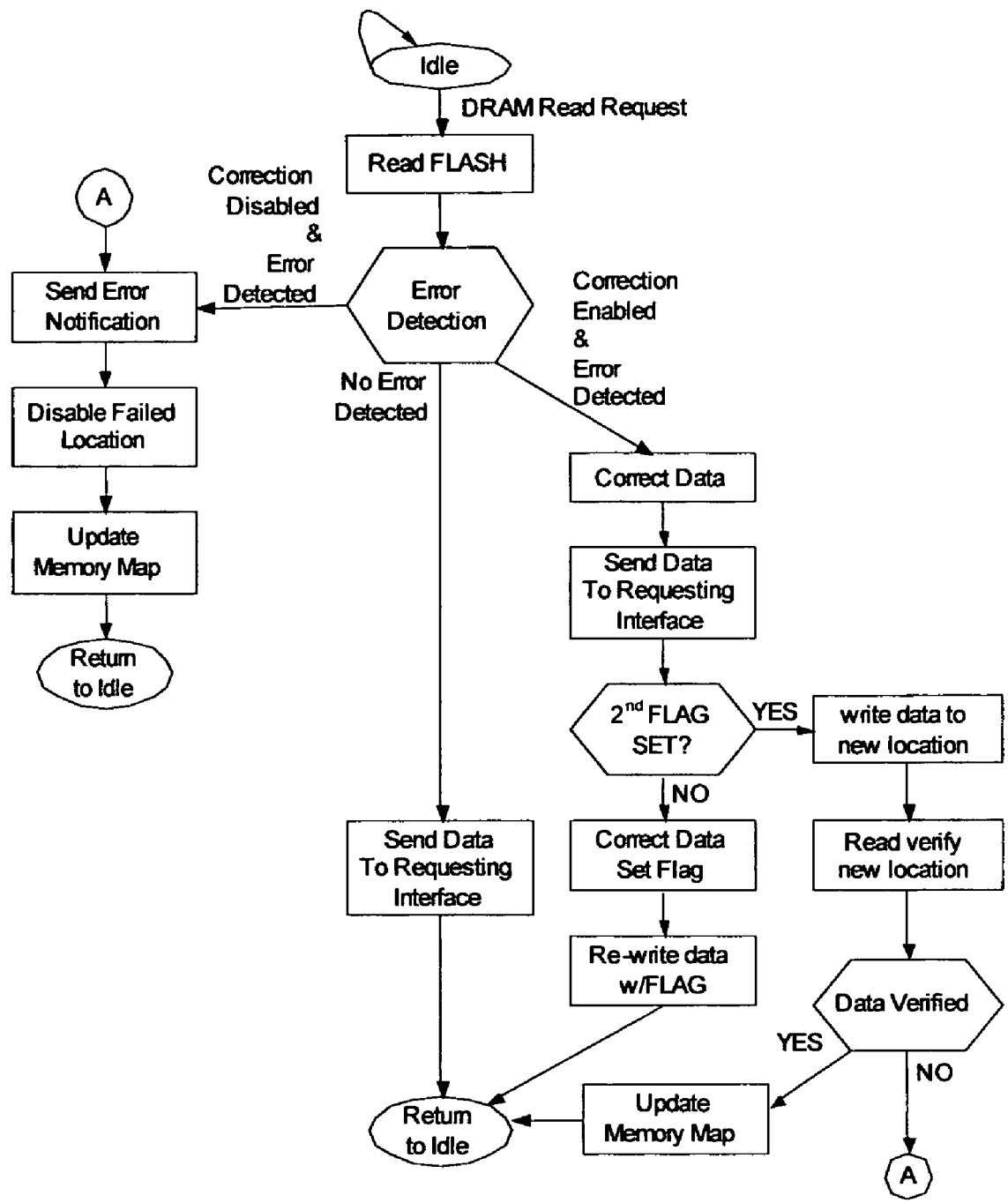
FIG. 14 FLASH ECC Flow Diagram

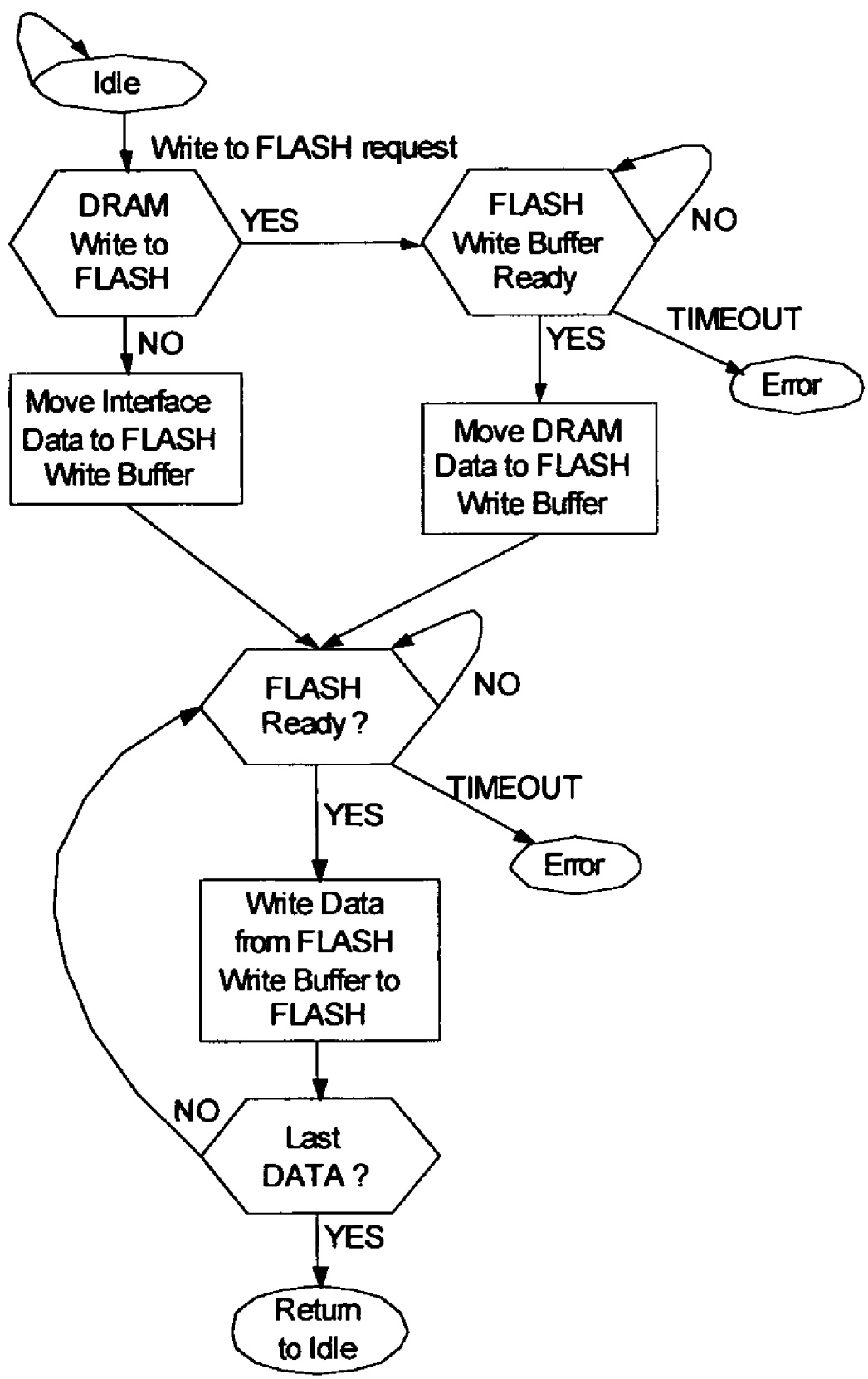
FIG. 15 FLASH Write Manager Flow Diagram

ADVANCED DYNAMIC DISK MEMORY MODULE

CROSS REFERENCE TO RELATED APPLICATIONS

This non-provisional application claims the benefit of previously filed provisional application 60/690,451; filed 13 Jun. 2005; and entitled "Advanced Dynamic Disk Memory Module", the entirety of which is hereby incorporated by reference.

FIELD OF THE INVENTION

The present invention relates generally to a plug and play end-user add-in memory module for computers and consumer electronic devices, and more particularly relates to methods and apparatus for providing additional high performance memory resources for computational or media systems used to accelerate application launch and improve operational performance of application and data sets.

BACKGROUND

The concept of a RAM based disk substitute has been a part of the Personal Computer (PC) for many years. There are many software programs that set aside blocks of installed main memory for use as a temporary disk partition. The effect of creating such partitions is intended to improve the overall performance of the PC. One advantage of such a product is the increased speed at which a user can access a program or data that is stored in the RAM-based disk partition; However, a drawback of these products is reduced system performance when too much of the main memory is reserved for the RAM-based disk partition. In this case, insufficient scratch pad memory is available to hold the executing program and associated data. This reduction in available main memory forces the PC to use the Hard Disk Drive (HDD) to extend the storage space that it requires to run the application and access the data. This action is commonly referred to as paging.

It is well-known that access performance of a HDD is lower than that of main memory. The performance degradation due to paging to the HDD rapidly overwhelms any performance gain from the use of a RAM-based disk. The performance degradation effects are further compounded in systems that share main memory for integrated graphics solutions (known as Unified Memory Architecture (UMA)). The UMA graphics rely on sharing main memory for the frame buffer and operational scratchpad in a manner similar to that of RAM-based disk products. Systems supporting RAM-based disks and UMA graphics have three sources competing for main memory resources.

Most PC systems offer upgrade options to increase the amount of main memory via, for example, existing extra DRAM memory module connectors on the motherboard. However, these extra connectors are usually difficult to access by the end-user, and in the case of many new systems may not even be available at all.

What is needed is a product and a method for the PC end-user to add low-cost high performance memory to their PC that improves the overall performance of that personal computer with no impact to the main memory resources.

SUMMARY OF THE INVENTION

Briefly, a memory module, in accordance with the present invention, provides the functionality of a RAM disk without incurring the main memory performance degradation associated with conventional RAM disks. Various embodiments of the present invention may be added to a system via internal connectors, or may be connected via readily accessible external connectors as is described herein.

BRIEF DESCRIPTION OF THE DRAWINGS

FIG. 6 is an illustrative high-level operational flow chart for ADDMM.

FIG. 7 is a partition and address lookup table operational flow diagram showing a mechanism used to direct Data requests to the correct location in ADDMM.

FIG. 8 is an example of a memory address map for a single partition memory module.

FIG. 9 is an example of a memory address map for a two partition memory module.

FIG. 10 is an example of a memory address map for a four partition memory module.

FIG. 11 is an illustrative functional flow diagram for the address lookup tables used in an ADDMM controller.

FIG. 12 is an illustrative flow diagram of a DRAM ECC operation.

FIG. 13 is a flow diagram of illustrative Multi-Channel FLASH operations.

FIG. 14 is a flow diagram of an illustrative FLASH ECC operations, one required per channel of FLASH supported.

FIG. 15 is a flow diagram of the operations of a FLASH Write Manger in accordance with the present invention.

DETAILED DESCRIPTION

Figure 1:
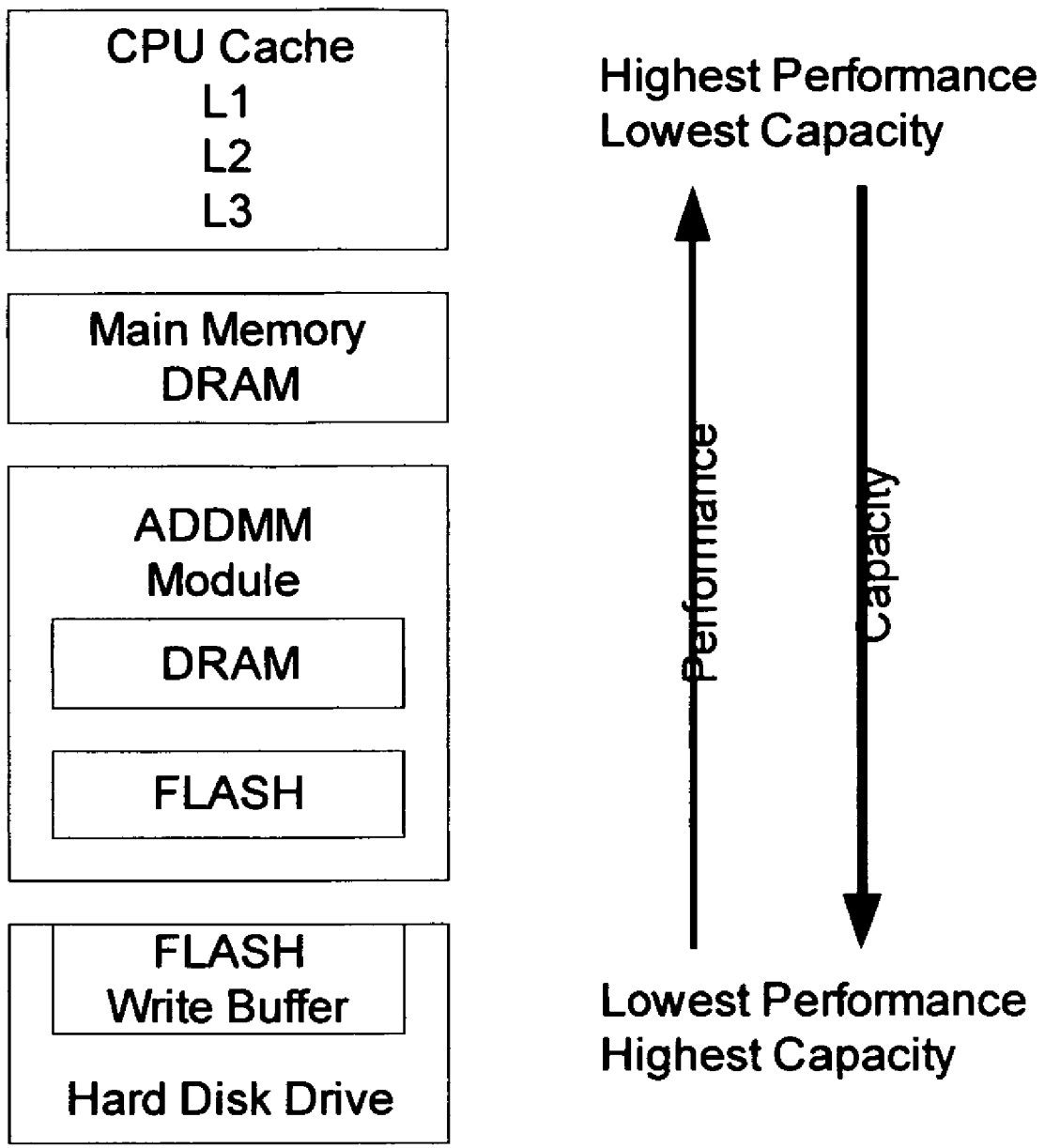
FIG. 1 is a memory hierarchy diagram showing the relative position of the Advanced Dynamic Disk Memory Module in the overall Personal Computer System memory hierarchy.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Terminology

The terms chip, integrated circuit, semiconductor device, and microelectronic device are sometimes used interchangeably in this field. The present invention relates to all of the foregoing as these terms are commonly understood in the field.

System performance of a personal computer (PC) may generally be improved by adding high performance memory. This is usually done by adding main memory or replacing an existing memory module already in the PC with a higher capacity memory module. Embodiments of the present invention typically include high speed memory, such as DRAM, and/or a combination of DRAM and slower writeable non-volatile memory such as FLASH. In the DRAM and FLASH configuration the DRAM acts as a buffer for the FLASH devices. The amount of DRAM and the amount of FLASH on this memory module is configurable at the time of manufacture.

In a further aspect of the invention, the memory module capacity is configurable by the PC to optimize performance for any given usage model. This configuration is called partitioning. A DRAM only configuration for this memory module may be used by the system under certain power conditions and power managed states. It is known that if power is interrupted volatile memory devices lose the integrity of their contents and hence must be reloaded with the appropriate application and data by the driver software or by the operating system. A combination DRAM and FLASH memory module can maintain this information indefinitely in the non-volatile FLASH devices. The applications and data will be maintained during any of the power-managed states including the power-off state of the system. Some examples of those states are full-on, standby, hibernate and power-off. Specialized driver software, or the operating system (OS), is responsible for managing and maintaining coherency of the applications and data stored on this memory module.

In one embodiment of the present invention, the memory module is a hybrid module including DRAM and FLASH memory. This configuration provides a desirable trade-off for a cost-effective high-performance solution in the PC environment. In this configuration the DRAM is used in a number of ways to improve system performance. First a portion of the DRAM space, or all of the DRAM space, can be allocated as a write buffer to the FLASH memory devices. By buffering the write traffic to the FLASH devices in the DRAM, the the DRAM can also used as a read buffer where the most recently used data and applications are temporarily stored. The DRAM in this module allows for the PCI Express bus and the USB bus in the Express Card interface to run at full read and write bandwidths. Without the DRAM, the FLASH devices can sustain only a portion of the available interface read bandwidth and a small portion of the write bandwidth.

The DRAM also plays an important role in reducing the amount of random write traffic to the FLASH memory. Reducing the number of Erase/Write cycles to the FLASH devices is very important in managing the life expectancy of the FLASH memory. FLASH memory has a limited number of Erase/Write cycles before device failure is expected. This is known as FLASH endurance. FLASH endurance is an important parameter when using FLASH as a storage medium in PC systems.

Various memory modules in accordance with the present invention include memory that is used for creating a dedicated RAM-based disk (hereinafter referred to simply as RAM disk) for a personal computer system without consuming main memory resources. Since extra memory is added to the system, the system enjoys a performance advantage without the negative impact caused by consuming main memory to support a RAM disk. Alternatively, such a module may also operate in conjunction with an expandable system bus whereby a plurality of such modules may be installed.

Another issue in using conventional RAM disk is that it relies on the volatile main memory to store the application and or data image. If power is lost, or the system goes through a hard re-boot, the data is lost and the operating system or custom driver is required to restore the memory to a known good state. The re-loading process is often a slow and frustrating event when using a personal computer. Various embodiments of the present invention overcome these problems by including non-volatile and/or semi-volatile memory which substantially reduces or eliminates the problems associated volatile DRAM-based RAM disks at a cost and performance level substantially better than that of FLASH only devices.

The memory hierarchy of FIG. 1 shows where ADDMM fits in the PC performance/capacity continuum. Modules in accordance with the invention fill the performance gap between main memory and the Hard Disk Drive (HDD). In order to fill that gap effectively the ADDMM uses both DRAM and FLASH to deliver the targeted performance and capacity. ADDMM is a cost-effective end-user add-in memory module that is pluggable in the system much like existing compact FLASH card readers and SD media card readers.

Figure 2:
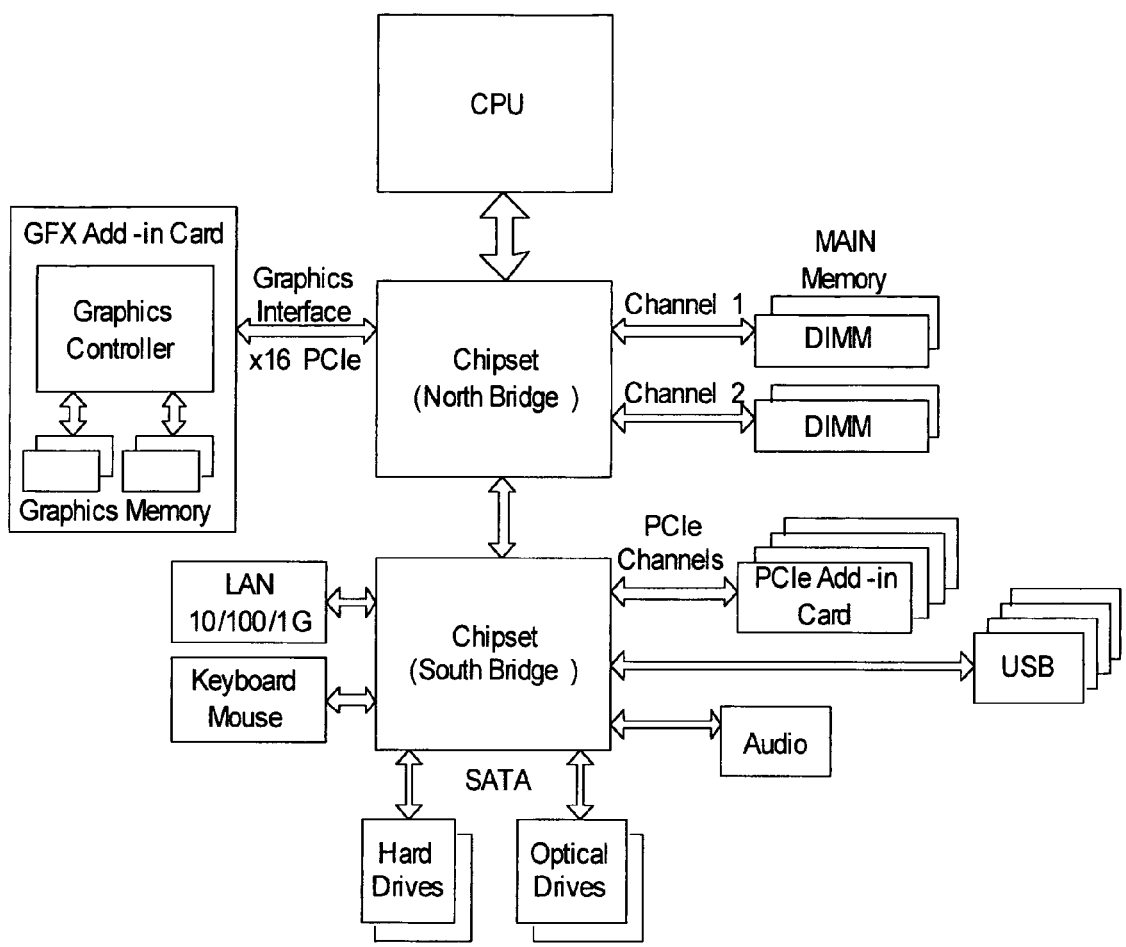
FIG. 2 is a Personal Computer (PC) system block diagram showing relative architectural location of key components and bus interconnects.

The block diagram of FIG. 2 shows the elements of a conventional PC with the various interfaces and components. The data in TABLE 1 shows the various usage models and where the interface points are. It is noted that there are PCI Express interfaces on both the North Bridge and South Bridge (i.e. chipset components). It is further noted that the USB bus is on the South Bridge along with the Serial ATA (SATA) interface. The ExpressCard interface used with embodiments of the present invention includes both a single PCI Express channel and a single USB Channel. Various embodiments work with both the PCI Express interface and the USB interface together under certain configurations. Various embodiments may also work with only one of the interfaces under certain other configurations. The location of the interface is due to existing system architectures but is not meant to be a limitation on the invention (see FIG. 3). The only requirement is that the embodiments be attached to at least one of the PCI Express or SATA interfaces. USB alone is an option but not the best interface for the preferred invention. Another point to note is that the closer the interface attach-point is to the CPU, the better the overall performance the PC realizes from use of the present invention.

TABLE 1

| Interface Usage Options | | | | |
|---|---|---|---|---|
| Usage Option | PCI Express | USB | SATA | Attach Location |
| Interface usage #1 | Yes | Yes | No | South Bridge |
| Interface usage #2 | Yes | No | No | North or South Bridge |
| Interface usage #3 | No | Yes | No | South Bridge |
| Interface usage #4 | No | No | Yes | South Bridge |

Figure 3:
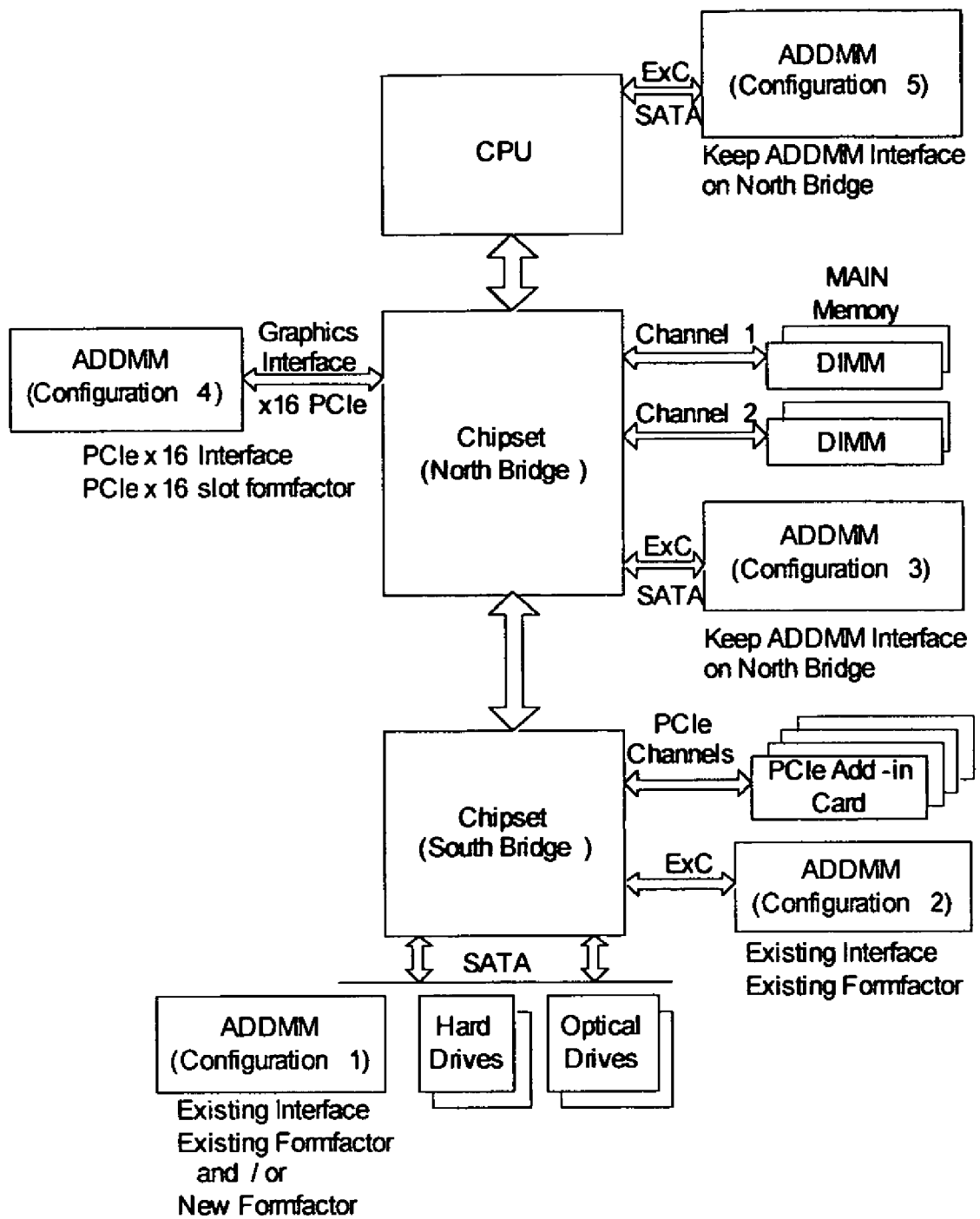
FIG. 3 is a PC System Block Diagram showing design configuration options for the Advanced Dynamic Disk Memory Module (ADDMM).

The block diagram of FIG. 3 shows five possible system configurations regarding where embodiments of the present invention may be used. Each of the configurations provides a different trade-off with respect to its own advantages, risks, performance, features and cost/complexity. The only new location being identified in FIG. 3 over existing systems is the possibility that either a PCI Express or a SATA interface may be added to the CPU.

Referring to FIG. 3, various alternative connection architectures, or design attach points, are described. Design Attach Point #1 shows ADDMM attached to the SATA interface. This location provides for the highest level of system interaction utilizing existing interfaces and software to manage the interface with existing disk drives such as RAID protocols and real-time disk coherency. The location and protocol add latency to the interface but provides a performance enhancement over what is provided by a HDD.

Design Attach Point #2 shows ADDMM on the ExpressCard interface. The ExpressCard is an industry standard interface that has a high degree of hardware and software support and is currently defined for PCIe Gen1 and USB 2.0 operation. Some existing disk software infrastructure is lost, as compared to Design Attach Point #1, but some performance enhancements may be gained through improved latency due to locality relative to the CPU on some PC designs.

Design Attach Point #3 shows an ExpressCard or a SATA interface on the North Bridge controller chip. This option shows a location that reduces system latency by eliminating the command transit through the South Bridge. The value this option provides is improved performance through reduced latency, and the opportunity to be used as part of UMA or main memory through software partitions.

Design Attach Point #4 shows a PCI Express interface re-using the Graphics interface port. This gives up to 16 PCIe channels for a substantial bandwidth improvement over a single PCIe and/or 3 to 4 SATA channels. This interface is also one of the lowest latency available in the PC, and exists on almost all present day PCs.

Design Attach Point #5 shows an ExpressCard or SATA interface at the CPU. This eliminates one more level of latency for the ADDMM. The latency through this connection is similar to that of the main memory as there is only one controller in which the requests are routed. It is noted that this attach point does not eliminate the need for main memory since the bandwidth available in main memory is significantly higher than that of the ADDMM.

It is noted that the present invention is not limited to the above-described interfaces, and various embodiments of the present invention may be used with any suitable alternative memory system arrangement or interface.

Three illustrative configurations of the invention, 1) DRAM only; 2) FLASH only; and 3) both DRAM and FLASH; are discussed below.

The DRAM only module-configuration delivers the highest performance for any of illustrative module configurations. A DRAM-only solution has limitations for usage during power-managed states since the DRAM is volatile. The DRAM-only module is not expected to maintain data if power is lost to the memory module unless an auxiliary power source is present. Because the DRAM loses data without an auxiliary power source, it is secure from tampering and secure from data theft when the module is removed from the system. The DRAM-only module may support multiple selectable partitions. Each partition can be treated equally and/or independently depending on usage module and system requirements.

The FLASH-only memory module configuration has better performance than existing USB FLASH drives but does not offer substantial performance benefits. This is not expected to be a typical configuration for the ADDMM, however it is the lowest cost per bit capacity design. Performance of this configuration is expected to improve as FLASH technology improves. The FLASH-only configuration may support multiple partitions.

The DRAM and FLASH combination configuration is a compromise design delivering good performance and high capacity at a market-acceptable price point. This configuration can take full advantage of the ExpressCard interface performance much like the DRAM-only configuration. It has FLASH memory to provide non-volatile storage to better handle power-managed states and to provide adequate capacity. In operation, typical embodiments will not retain data in the DRAM during hibernate and power-off states, and/or in the event of a power loss, unless an auxiliary power backup is provided. The auxiliary power backup, if provided, is preferably sized to allow for the flushing of the DRAM content to FLASH in order to prevent data loss in case of an unplanned power interruption.

The disk drive and memory parameters shown in TABLE 2 highlight differences between solid state memory and hard disk drives with regard to latency and bandwidth. It is noted that the preferred DDR2 type DRAM has bandwidth that is at least 2× that of the presently available interfaces in present PC systems to which it may be connected. It is further noted that various types of FLASH, e.g., the NAND flash memory, has lower read and lower write bandwidth than the presently available interfaces in PCs.

Figure 4:
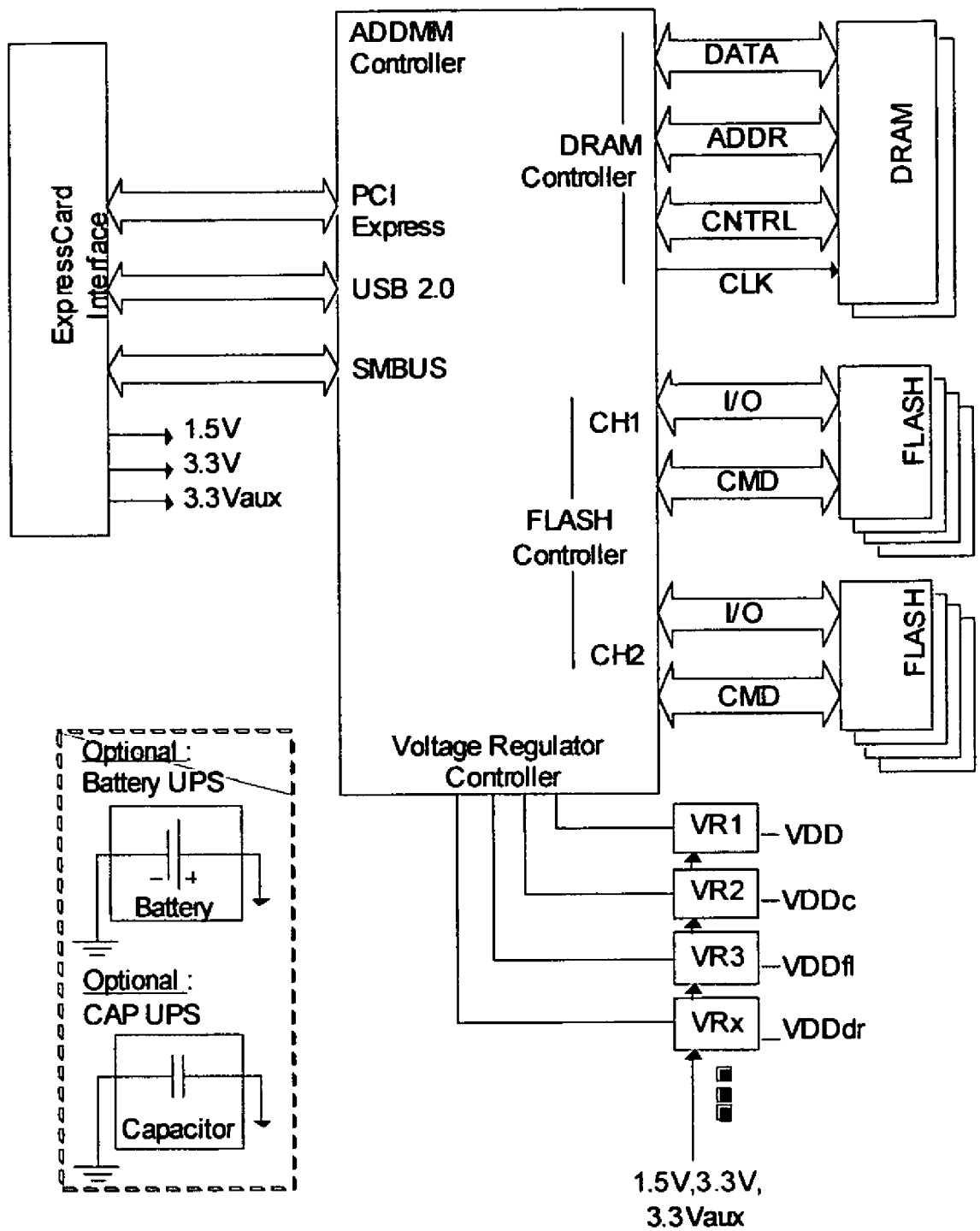
FIG. 4 illustrates the ADDMM module functional block diagram showing the key interfaces and components of an exemplary memory module.

Referring to FIG. 4, a memory module functional block diagram in accordance with the present invention illustrates a DRAM interface and two interface channels for FLASH. Two FLASH channels are defined in order to increase the read bandwidth to an acceptable level. Doubling the FLASH interface width does improve write bandwidth but it remains substantially lower performance than the available interfaces, particularly the multi-level (ML) FLASH technology. Write bandwidth is a known bottleneck in the overall PC system performance when using FLASH memory. The DRAM is used as a write buffer to dramatically reduce the write bandwidth impact to system performance.

TABLE 2

Disk Drive & Memory B/W & Latency Parameters

Disk

| | Internal | | | External | | | Avg Seek | Avg Latency | | Spindle | |
|---|---|---|---|---|---|---|---|---|---|---|---|
| Ultra ATA 100 | | | Mb/s | 100 | | MB/s/ch | now | 12.5 | 5.56 | ms | 5400 | rpm |
| SATA I | 1.2 | 1.5 | Gb/s | 150 | 187 | MB/s/ch | now | 8.5 | 4.16 | ms | 7200 | rpm |
| SATA II | 2.4 | 3.0 | Gb/s | 300 | 375 | MB/s/ch | 2005 | | | | | |
| SATA III | 4.8 | 6.0 | Gb/s | 600 | 750 | MB/s/ch | 2007 | | | | | |
| PCIe Gen1 | 2.0 | 2.5 | Gb/s | 250 | 313 | MB/s/ch | | | | | | |
| PCIe Gen 2 | 4.0 | 5.0 | Gb/s | 500 | 625 | MB/s/ch | | | | | | |
| USB 2.0 | 480.0 | | Mb/s | 60 | | MB/s/ch | | | | | | |

| | Raw Serial BW | | Sustained BW | | | Latency | | | |
|---|---|---|---|---|---|---|---|---|---|
| Memory x8 | rd | wr | rd | wr | | tRCD | tRP | tRC | Avg |
| DDR2 667 | 5.3 | Gb/s | 667 | MB/s/x8 | now | 12 | 12 | 54 | ns |
| DDR2 800 | 6.4 | Gb/s | 800 | MB/s/x8 | 2005 | 12 | 12 | 54 | ns |
| DDR3 1033 | 8.3 | Gb/s | 1033 | MB/s/x8 | 2007 | 11 | 12 | 54 | ns |
| DDR3 1333 | 10.7 | Gb/s | 1333 | MB/s/x8 | 2008 | 10 | 12 | 53 | ns |

TABLE 2-continued

Disk Drive & Memory B/W & Latency Parameters

| Nand FLASH | 264 | 56 | Mb/s | 33 | 7 | MB/s/x8 | 25 | us |
|---|---|---|---|---|---|---|---|---|
| NOR FLASH | 608 | 72/1 | Mb/s | 76 | 9/.133 | MB/s | 110 | ns |
| One-Nand FLASH | 544 | 144 | Mb/s | 68 | 18 | MB/s | 30 | us |
| 2.5" HDD | 640 | 512 | Mb/s | 80 | 64 | MB/s | 5.6 | ms |
| uDrive | 56 | 56 | Mb/s | 7 | 7 | MB/s | 8.33 | ms |
| Assumptions | | | | | | | | |
| Controller Latency | 40.0 | ns | | | | | | |

Using simple calculations and adding estimates for controller latency it is apparent that a memory device, that is neither a disk cache nor part of main memory, can add substantial performance to the system. Bandwidth is limited by the interface that is used to add this memory to the system. Available bandwidth also translates into access latency. If the available bandwidth is less than the interface bandwidth then the time it takes for the requested data to be read from, or written to, the memory will increase thus reducing system performance. TABLE 2 outlines the BW available by the different interfaces currently available in the system that is used for the calculation.

The benefit of using embodiments of the present invention can be seen from the following:

$$\text{Average Disk Latency} = 4.16 \text{ ms (See TABLE 2)}$$

$$\begin{aligned}\text{Average Memory Latency} &= 214 \text{ ns} \\ &= 54 \text{ ns} + 60 \text{ ns (transit time)} + \\ &\quad 100 \text{ ns (arbitration)}\end{aligned}$$

Latency Improvement:
Average Disk Latency/Average Memory latency=Speed up
4.16 ms/214 ns=19,440× improvement Even if there is excessive latency under worst case memory access, assuming 5× worse, which is 1.07 us, the improvement would be >3500× over existing disk drives.

Latency is impacted by the bandwidth of various embodiments. The time it takes to get the data from the memory module into the system adds to the latency of the access. With embodiments having the above-described mix of DRAM and FLASH, the interface will be the performance limiter in presently available systems. As shown in TABLE 2, the preferred DRAM memory has 2× to 3× the bandwidth than the best external interface today can consume with just a single 8 bit wide DRAM device. X16 DRAM devices can deliver 4× to 6× the necessary consumable bandwidth for the interface. This extra available bandwidth is important when looking at the interaction of the DRAM with the interfaces and with the FLASH. The added bandwidth allows the DRAM to concurrently service all available system interfaces to the memory module and the FLASH memory devices as the write buffer to those FLASH devices. The extra available bandwidth from the DRAM devices permits reduction of the operating frequency of the DRAM devices thus making the memory module easier to design, improving the robustness of the memory module design, and typically reducing costs by using the lowest cost DRAM components.

Controller Operation

Figure 5:
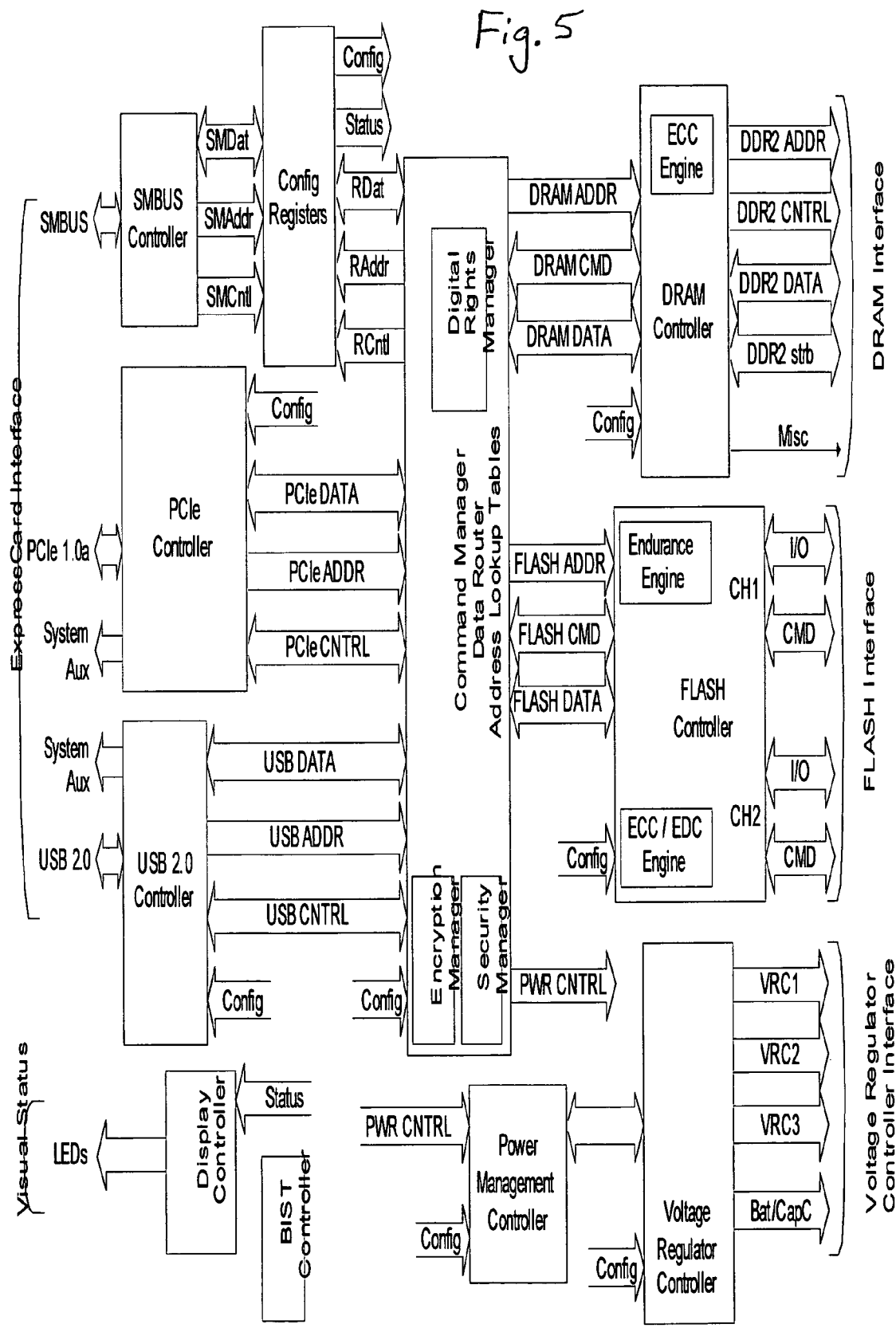
FIG. 5 is a detailed functional block diagram of an exemplary ADDMM controller identifying most of the major interfaces and control blocks for the controller.

Various embodiments of the present invention include a controller to provide the functionality described herein. The controller functional block diagram in FIG. 5 shows the major elements, including sub-controller blocks, of the controller. In other words, the controller for the memory module in accordance with the present invention includes various logical blocks, which may also be referred to as sub-controller blocks, that control the operation of the various interfaces and features. An ExpressCard interface refers to a well-known and defined industry standard that is comprised of one PCI Express interface, one USB interface and one SMBUS interface. The primary operational connection is through the PCI Express interface. The USB interface can also be used under certain configurations and circumstances but it operates at a much lower performance point than does the PCI Express interface. The SMBUS interface is used for intra-system communication. The SMBUS controller block primarily manages information from a set of internal registers that are used for configuration support and memory module status. Those skilled in the art and having the benefit of this disclosure will appreciate that various logic and/or circuit blocks used for implementing the various "standard" interfaces may be, but are not required to be, re-used from pre-existing chip designs.

In one embodiment a display controller block, such as shown in FIG. 5, is provided to support pre-defined, or pre-determined, visual indicators. Since there may be multiple memory modules in accordance with the present invention installed in a PC, and each of the instances may be used differently, it may be valuable to the user to have a visual indicator to identify the function of each of the memory modules. For example, control logic for driving light emitting diodes (LEDs) or similar visual indicators, can be included within the controller of the memory module. Such control logic would activate one or more LEDs, or LEDs or different colors to indicate to a user how the memory module is configured and/or to what interfaces it is coupled. Those skilled in the art and having the benefit of this disclosure will appreciate that various other indicator schemes may be provided within the scope of the present invention.

An illustrative power management controller block, such as shown in FIG. 5, is configured to operate in accordance with the industry standard ACPI Power Management specification. Part of this power management controller block is the option to build into embodiments of the present invention a voltage regulator (VR) controller for the module. Preferably this VR controller would be used to regulate and deliver all of the voltages needed by various embodiments.

An illustrative DRAM controller block, such as shown in FIG. 5, is configured to operate with DDR2 DRAM. Embodiments of the present invention are accessed differently than the main memory in a PC. Main memory in a PC typically accesses data in as small as a single DRAM read or write, which may be, for example, four words (64 bits) of data. Often a system request requires only a portion of the retrieved data for the given application. The preferred invention is expected to have minimum access requirements of 512 Bytes of data and typically will require minimum data sets as large as 4K Bytes of data and possible larger in the future. Due to the larger granularity of access requirements the DRAM controller block configured to operate with DDR2 DRAM can be simplified.

In some embodiments, an error correction (ECC) engine may be included in the DRAM controller block to ensure data integrity on the memory module. This ECC engine is configured specifically for the DRAM. It detects and corrects data failures caused by soft errors and by hard errors at read time due to a failing memory bit or bits in the DRAM. The failed location information is used to update the available memory location in the memory allocation tables.

The ECC engine operates as shown in FIG. 12. A read request is sent to the DRAM. The data is returned from the DRAM and checked for errors under control of the ECC engine. If an error is detected but the error correction is disabled, then an error notification is sent to the requesting interface in place of the data expected. The failed location is then disabled by moving the address of that location to a failed map. The routine then returns to the Idle state and waits for the next read request. If the ECC engine does not detect an error after a DRAM read, then data is returned to the requesting interface and the ECC engine returns to idle to wait for the next read request. If the ECC engine detects an error and the correction function is enabled, then data is corrected, and forwarded to the requesting interface. After forwarding corrected data to the requesting interface, the ECC controller checks to see if that location had previously failed. If the location had not previously failed, then a failed flag is set and the corrected data is re-written to the DRAM. If the failed flag had been previously set, then the data is written to a new location in the DRAM, and that data is then verified for correctness. If the data is verified, then the memory address map is updated with the current data status and the ECC engine returns to idle. If data is not verified, then an error report is issued to the requesting interface indicating that a data error has occurred and that the data was corrected but can not be saved in a known good state. It is then up to the user to intervene regarding appropriate actions to take.

A flash controller block, as shown in FIG. 5, is also necessary. The illustrative embodiment of FIG. 5 is configured to support two channels of FLASH operating in lock step to double the available FLASH bandwidth. There are many issues when operating two channels of FLASH in lock step that must be managed. FIG. 13 shows some of the basic issues that are required to deal with in running dual channels of FLASH. First reads and writes are handled somewhat differently. The write cycle in a dual channel environment is the most familiar and is not significantly different from that of a single channel FLASH write. The main operational difference to manage is that each channel is operated independently and when writing to a specific Logical Block Address (LBA) location each channel most probably will be pointing to physically different locations. Once the write sequences are started, the Flash controller block needs to wait until both write sequences are complete prior to returning to Idle to start another operation. In any given embodiment, depending on how large a buffer is included in the embodiment, it is possible for some controller blocks to start another write cycle on the FLASH channel that has completed its write sequence without having to wait for the write cycle on the second channel to complete its write cycle. If a read were to be requested in the middle of a write cycle and that read hits a write in progress but not completed the read must wait until the write cycle is completed unless the full read content is available in the buffer. If the read content is available, then the read data can be returned without waiting for the write cycle to complete. If the buffer contents were invalidated and the read data is only available in the FLASH devices, then the FLASH write cycle must be completed prior to issuing a read access to the FLASH devices.

A FLASH read request in a multi-channel FLASH environment departs significantly from access requests to a single channel FLASH read environment. FIG. 13 shows read request initiates a parallel read from both channel one and channel two. This read assumes that the read could not be serviced from the internal buffers or from the DRAM. Read data from each channel is sent to an alignment buffer. This alignment buffer is required due to the read nature of the FLASH devices. A consistent read latency is not guaranteed by each flash device in any given channel. The latency is dependent on several different factors in the FLASH devices. The primary difference is if the devices are single level storage elements or multilevel storage elements and what state and where the data is stored. This is much more complicated than operating using multiple channels of DRAM which all have deterministic latencies. The alignment buffer needs to be sized large enough to hold at least one access of each of the FLASH channels in order to align the data. A buffer size consisting of many FLASH data reads may be required to optimize system performance. The size of this buffer for optimal performance is dependent on data set request sizes and the nominal latency delta between the FLASH channels. Once data has been collected of the appropriate data set size, as requested by the host interface, and for simplicity we will use an 8 Byte request, and that 8 Bytes is ready that read data is queued to be sent to the requesting interface. Once the data is sent to the host queue the state machine loops until the full data request is returned and then returns to idle to wait for the next command.

An ECC engine is also required for the FLASH controller block, as shown in FIG. 14. This ECC engine is not significantly different from the one used for the DRAM ECC engine, however an ECC engine is required per channel of FLASH being implemented. The controller operation may be subtly different due to the operational differences between DRAM and FLASH and the differences in the ECC algorithm used by each memory type. Each FLASH channel must be treated as independent even if they are linked by common data set. The specific ECC algorithms used by DRAM and by FLASH are significantly different. The differences are driven by the failure mechanisms and frequencies of expected failures in each memory type.

The functional block that ties the overall controller together is shown in FIG. 5 as the command manager data router address lookup tables block. This block is responsible for the interpretation of the commands as they are received from the PCI Express interface or from the USB interface. It then acts on those commands issuing data read, data write, and status request commands to the appropriate control blocks. The functional operation is shown in FIG. 6 "Functional Flow Diagram". For ease of explanation, the PCI Express interface is the described example. The USB interface would work similarly to the PCI Express interface.

Still referring to FIG. 6, during initialization of the system the PCI Express and USB interfaces are polled to identify add-in cards that may be present in the system. During that polling the ADDMM memory module identifies itself as an ATA compliant mass storage device to the host. A separate partition on the ADDMM memory module may be defined as a Bulk Only Transport (BOT) mass storage device on the USB interface. There is an industry standard limitation that any given partition can only be identified for use on one interface. This means that if the ADDMM memory module is configured with a single partition and is identified as a PCI Express interface client it can not also be defined as a USB client. If, however, the ADDMM memory module is configured as two partitions, one partition can be mapped to the PCI Express Interface and the second partition can be mapped to the USB interface. This flexibility in the ADDMM memory module controller allows the module to be optimized for maximum throughput in a system and optimized to better support a user's needs.

As shown in FIG. 6, a system request is sent to the PCI Express Interface and is identified as an ADDMM operation. The ATA command interpreter then determines what action to take. There is one of five basic actions that can be initiated.

The first possible action is to return back to idle to wait for another command. This action is taken if the command is determined to not be for the ADDMM memory module or the ADDMM memory module does not recognize it as such. In the event that the command was targeted to the ADDMM memory module and it could not recognize it as a valid request an error response may be initiated by the error handler.

The second possible action is that in certain circumstances the ATA command interpreter will return an error message to the host indicating that the command was targeted towards the correct location but due to some fault it is not able to respond.

The third action is a status request. The ATA command interpreter then looks up the appropriate data from the status registers and or performs a status check and then returns the appropriate status and response to the system. There may be some instances when performing a status check that appropriate status cannot be returned. The request is marked as failed and passed to the error handler. Once past the status check a lookup is performed and the response returned to the host.

The fourth possible action to respond to is a data read request. The read request is passed on to the lookup table where it is determined whether to get the data from the FLASH or from the DRAM. If the data is to be retrieved from the DRAM, then a read command with a length request is sent to the DRAM memory controller and then the data is returned to the host associated with the read request. If the data is to be returned from the FLASH memory, then a command is sent to the FLASH controller with a length of data to retrieve. While retrieving the FLASH data a flag may have been set that would cause the controller to not only stream the data to the host but to also copy that data to the DRAM. If the data is copied to the DRAM, then a CACHE flag is set in the lookup table to direct future accesses for this data to the DRAM. To prevent operational problems if there is a power loss event of any type, the lookup tables keep pointers back to the FLASH memory locations in the event data is needed by the host but cannot be retrieved from the DRAM. This data redundancy is managed for memory space up to the size of the available DRAM. Once the data has been returned to the host and copied to the DRAM, in the event that the DRAM flag was set, the controller will then return to idle and wait for another command. If an error is detected during the lookup, then the error is flagged and passed to the error hander.

Still referring to FIG. 6, the fifth action is a data write request. The physical write address is translated through the lookup table. If the ADDMM memory module does not have DRAM installed, then data is written directly to the FLASH. There is a small write buffer in the controller but it is not large enough to sustain multiple back-to-back write requests at full interface bus speeds directly to the FLASH. If DRAM is installed on the ADDMM memory module, then data is written to the DRAM regardless of FLASH availability unless it gets flagged for write directly to flash only. Write direct to FLASH is a special write sequence targeted for very unique functions and is not expected to be used in normal operations, although it may be supported by various embodiments. Special commands may be recognized by some embodiments to allow a direct to FLASH write for optimized system operation. Once the data is written to the DRAM, the controller marks the data as ready for writing to the FLASH. The FLASH write manager (as shown in FIG. 15) is then responsible for writing the DRAM data to FLASH. The FLASH write manager is also responsible for writing any data that may be placed in the FLASH write buffer regardless of the data's origin. The FLASH write manager determines if a data write to flash is ready. It then copies the DRAM data to the FLASH write buffer. Once the FLASH write buffer is filled with the appropriate data, a FLASH write sequence is started. The FLASH write manager then writes the data to FLASH when the FLASH is ready to accept it. There is a timer that can be configured for writing to the FLASH. If the FLASH is not ready to be written to prior to the timer timing out the controller flags an error to the error handler and returns the appropriate error message to the Host. If FLASH memory is present and it is ready to begin the very slow process of writing the data to FLASH, then the FLASH write sequence is started. It is expected that the FLASH write operation can and most likely will be interrupted due to possible read or status activity that must be performed by the host. Since FLASH write data is buffered by DRAM, the write cycles can be stopped to service a critical request. The DRAM to FLASH write manager determines if the FLASH write buffer is ready to accept write data from the DRAM. When the FLASH write buffer is ready, data is read from the DRAM and put into the buffer. If the buffer is not ready, then the controller waits until it is. If the write timer times out, then an error is flagged and passed on to the error handler. Once the FLASH write buffer has valid contents for a write to FLASH, the FLASH memory is checked to see if is ready to start a write cycle. If the FLASH is not ready, then the controller waits until it is. If the wait timer times out then an error has occurred and the information is passed to the error handler. Once the FLASH is ready to accept a write, data is written from the write buffer to the FLASH. This sequence of checking FLASH ready and writing from the FLASH write buffer will continue until the last data from the buffer is written at which time the controller returns to the idle state to wait for the next write command. Once the write to FLASH is complete for each of the logical blocks, the address lookup tables are updated with the new location information. If the write cycle from DRAM to flash is interrupted prior to completion, then the lookup tables will not be updated until the write sequence is complete for each logical block address. There are only two activities that can interrupt a write cycle to FLASH, a FLASH read request; and a FLASH status request. If a Write request is issued to FLASH that is required to bypass the DRAM memory that write can not be completed until the write sequence or sequences are completed from the DRAM to the FLASH. This is a very special case and should rarely if ever occur.

A critical operational element of the memory module controller is how the lookup tables work and how they are managed. FIG. 7 shows how a PCI Express command is parsed by the ATA command interpreter and the flow of the lookup and movement of the physical address to the FLASH memory request queue or the DRAM request queue. The ATA command interpreter strips out the partition enable and the starting logical block address. The partition information is used to enable the block of memory that the LBA will be used to identify the physical address for either the DRAM or the FLASH location in which to read data from and/or write data to. The physical address is then attached to the command in the FLASH request queue or in the DRAM request queue. In certain circumstances no partition may be identified associated with the request. Under this condition the lookup table controller will send an error report to the host. There are also certain conditions that may exist where the lookup table returns an invalid physical address from the LBA and partition information. If this happens an error is returned to the host through the error handling manager.

FIG. 11 shows how the Lookup tables are managed. The lookup tables use the partition information to select which block of lookup table to operate from. It then uses the logical block address information to lookup a physical location associated with the partition information whose content is used to identify the physical location of the data being requested. TABLE 3 shows how the lookup table entries are allocated. The lookup tables contain specific pointers to memory types available and to the locations where information is stored.

TABLE 3

Lookup Table Entry Allocation Map

| Memory Type | | Physical Location | | |
| --- | --- | --- | --- | --- |
| DRAM | FLASH | Physical | Physical | Physical |
| 1 = Yes | 1 = Yes | ADDRESS | ADDRESS | ADDRESS |
| 0 = No | 0 = No | DRAM | FLASH CH1 | FLASH CH2 |
| | | (PAD) | (PAF1) | (PAF2) |

The physical address for the DRAM and each channel of FLASH is managed separately. Because of FLASH specific issues surrounding endurance management and because some of the usage models allow for DRAM to operate independent of the FLASH, each channel of the FLASH device needs to be managed independent of the other. An example of this is shown in FIG. 10 where partition #1 is a DRAM only partition and partition #2 is a DRAM and FLASH partition and partitions #3 and #4 are FLASH only partitions. In this example, the partition table entries would look like the entries shown in TABLE 4.

TABLE 4

Example Lookup table mapping for FIG. 10

| | DRAM | FLASH | ADDRESS | | |
| --- | --- | --- | --- | --- | --- |
| Partition #1 | 1 | 0 | PAD | n.a. | n.a. |
| Partition #2 | 1 | 1 | PAD | PAF1 | PAF2 |
| Partition #3 | 0 | 1 | n.a. | PAF1 | PAF2 |
| Partition #4 | 0 | 1 | n.a. | PAF1 | PAF2 |

Various embodiments of the present invention support data encryption and digital rights management. Data encryption is primarily handled by the operating system and has minimal impact on embodiments of the invention. In various embodiments digital rights management may conform to industry standard requirements.

The built-in self test (BIST) controller shown in FIG. 5 is typically configured specifically for each embodiment. Its primary function is to be used to reduce test time during manufacturing and assembly. The BIST controller is not generally needed subsequent to the testing procedures of the manufacturer.

CONCLUSION

Embodiments of the present invention find application in PC systems where system performance can be enhanced by adding memory in the PC system memory hierarchy that is substantially better performance than conventional hard disk drives, and better performance than conventional USB FLASH drives.

Embodiments of the present invention can also find application in consumer electronics products where media content (e.g., video, audio) is desired. Examples of such consumer electronics products include, but are not limited to, video camcorders, televisions, personal display devices, gaming consoles and personal gaming devices.

The advantage of some embodiments of the present invention allow for the increased performance of a PC platform, including the reduction of power in a PC platform and the extension of life for the hard disk drives in a PC platform.

It is to be understood that the present invention is not limited to the embodiments described above, but encompasses any and all embodiments within the scope of the subjoined Claims.

What is claimed is:

1. A memory module; comprising:
a first memory comprising a volatile memory;
a second memory comprising two or more Flash memory devices; and
a controller coupled to the first memory and the second memory, the controller comprising:
a command interpreter;
a plurality of bus interface controller blocks coupled to the command interpreter, each of the plurality of bus interface controller blocks further coupled to a unique corresponding one of a plurality of bus interfaces;
a first memory controller block, coupled to the command interpreter, for communicating with the first memory;
a second memory controller block, coupled to the command interpreter, for communicating with the second memory such that a first one of the two or more Flash memory devices is coupled to a first channel interface of the second memory controller block and a second one of the two or more Flash memory devices is coupled to a second channel interface of the second memory controller block; and
at least one configuration register, the at least one configuration register coupled to the command interpreter;
wherein the memory module is an add-in memory module and is adapted to physically and electrically couple to a computer system having a main memory, receive and store data from the computer system, and retrieve and transmit data to the computer system; wherein neither the first memory or the second memory form part of the main memory; wherein the command interpreter receives commands from the computer system; wherein the controller is operable to receive and store memory partition configuration information of the memory module; wherein the second memory controller block includes at least one alignment buffer to receive and store read data from each of the first and the second Flash memory devices, which read data arrives at the alignment buffer responsive to simultaneous read requests from the second memory controller block; and wherein the read data from each of the first and the second Flash memory devices arrives at a different time.

2. The memory module of claim 1, further comprising a power management controller block coupled to the command interpreter to receive commands therefrom.

3. The memory module of claim 1, wherein a first memory partition is mapped to a first one of the plurality of bus interfaces and a second memory partition is mapped to a second one of the plurality of bus interfaces.

4. The memory module of claim 1, wherein the plurality of bus interface controller blocks includes an SMBUS controller block, a PCIe controller block, and a USB controller block.

5. The memory module of claim 1, wherein a first memory partition includes volatile memory only, a second memory partition includes volatile memory and non-volatile memory, and a third memory partition includes non-volatile memory only.

6. The memory module of claim 1, further comprising a plurality of look-up tables coupled to the command interpreter.

7. The memory module of claim 1, wherein the volatile memory is a DRAM.

8. The memory module of claim 1, wherein the system is a personal computer, and wherein data images are stored for accelerated access.

9. The memory module of claim 8, wherein an OS boot image from a power-off or hibernate state is stored for use to improve system boot time from a power-off or hibernate state.

10. The memory module of claim 8, wherein application images are stored for accelerated access.

11. The memory module of claim 8, wherein the controller is operable to keep track of used and available space in the first memory, and in the second memory.

12. The memory module of claim 1, wherein the first memory operates as a write buffer to the second memory.

13. The memory module of claim 12, wherein the first memory is DRAM memory, the second memory is Flash memory, and the memory module is operable to interrupt a DRAM data write to Flash to service a Flash read.

14. The memory module of claim 1, wherein the command interpreter is operable to receive an access request, determine the type of access, lookup first memory addresses and second memory addresses, send the access request to a first memory access queue if the first address is valid and the send the access request to a second memory access queue if the first address is not valid; and wherein the access request is selected from the group consisting of read access request and write access request.

15. A memory module; comprising:
a controller comprising:
 a command interpreter;
 a plurality of bus interface controller blocks coupled to the command interpreter;
 a first memory controller block, coupled to the command interpreter;
 a second memory controller block, coupled to the command interpreter, the second memory controller block having a first channel interface, a second channel interface, and an alignment buffer coupled to each of the first and second channel interfaces;
 a power management controller block coupled to the command interpreter; and
 at least one configuration register, the at least one configuration register coupled to the command interpreter;
a first memory comprising a volatile memory, the first memory coupled to the first memory controller block of the controller;
a second memory comprising two or more Flash memory devices, a first one of the two or more Flash memory devices coupled to the first channel interface, and a second one of the two or more Flash memory devices coupled to the second channel interface; and
wherein the memory module is adapted to physically and electrically couple to a computer system having a main memory, receive and store data from the computer system, and retrieve and transmit data to the computer system; wherein the power management block is coupled to the command interpreter and further coupled to at least one voltage regulator; wherein the controller is operable to receive and store memory partition configuration information of the memory module; wherein the alignment buffer is operable to receive and store read data from each of the first and the second Flash memory devices, which read data arrives at the alignment buffer responsive to simultaneous read requests from the second memory controller block; and wherein the read data from each of the first and the second Flash memory devices arrives at a different time.

16. The memory module of claim 15, wherein a first memory partition includes volatile memory only, a second memory partition includes volatile memory and Flash memory, and a third memory partition includes Flash memory only.

17. A memory module; comprising:
a controller comprising:
 a command interpreter;
 a plurality of bus interface controller blocks coupled to the command interpreter;
 a first memory controller block, coupled to the command interpreter;
 a second memory controller block, coupled to the command interpreter, the second memory controller block having a first channel interface, a second channel interface, and an alignment buffer coupled to each of the first and second channel interfaces;
 at least one configuration register, the at least one configuration register coupled to the command interpreter;
a first memory comprising a volatile memory, the first memory coupled to the first memory controller block of the controller;
a second memory comprising two or more Flash memory devices, a first one of the two or more Flash memory devices coupled to the first channel interface, and a second one of the two or more Flash memory devices coupled to the second channel interface and
wherein the memory module is adapted to physically and electrically couple to a computer system having a main memory, receive and store data from the computer system, and retrieve and transmit data to the computer system; wherein the controller is operable to receive and store memory partition configuration information of the memory module; wherein the alignment buffer is operable to receive and store read data from each of the first and the second Flash memory devices, which read data arrives at the alignment buffer responsive to simultaneous read requests from the first and second channel interfaces of the second memory controller block; and wherein the read data from each of the first and the second Flash memory devices arrives at a different time.

18. The memory module of claim 17, wherein the alignment buffer has a storage size large enough to store two or more sets of read data from each of the first and the second channel interfaces of the second memory controller block.

19. The memory module of claim 18, wherein the second memory controller block is operable to initiate a first write operation to the first one of the two or more Flash memory devices, and a second write operation to the second one of the two or more Flash memory devices, wherein the first write operation and the second write operation are initiated simultaneously.

20. The memory module of claim 19, wherein the second memory controller block is operable to initiate a third write operation to the first one of the two or more Flash memory devices if the first write operation is completed prior to the second write operation.

* * * * *